United States Patent
Sakashita

(10) Patent No.: US 9,444,953 B2
(45) Date of Patent: Sep. 13, 2016

(54) IMAGE FORMING APPARATUS CONFIGURED FOR IDENTIFYING USER WHO LEFT PRINTED DOCUMENT IN THE OUTPUT TRAY

(71) Applicant: KYOCERA Document Solutions Inc., Osaka-shi, Osaka (JP)

(72) Inventor: Fumiya Sakashita, Osaka (JP)

(73) Assignee: KYOCERA DOCUMENT SOLUTIONS INC., Osaka-Shi, Osaka (JP)

(*) Notice: Subject to any disclaimer, the term of this patent is extended or adjusted under 35 U.S.C. 154(b) by 0 days.

(21) Appl. No.: 14/810,503

(22) Filed: Jul. 28, 2015

(65) Prior Publication Data

US 2016/0037004 A1    Feb. 4, 2016

(30) Foreign Application Priority Data

Jul. 31, 2014 (JP) ................ 2014-155767

(51) Int. Cl.
   *G06F 3/12* (2006.01)
   *H04N 1/00* (2006.01)
   *H04N 1/32* (2006.01)

(52) U.S. Cl.
   CPC ...... *H04N 1/00408* (2013.01); *H04N 1/00042* (2013.01); *H04N 1/00076* (2013.01); *H04N 1/00251* (2013.01); *H04N 1/32149* (2013.01); *H04N 2201/0094* (2013.01)

(58) Field of Classification Search
   None
   See application file for complete search history.

(56) References Cited

U.S. PATENT DOCUMENTS

| | | | | |
|---|---|---|---|---|
| 8,139,959 B2* | 3/2012 | Sato | ............. | G03G 21/02 399/405 |
| 8,537,381 B2* | 9/2013 | Kunori | ............. | G03G 15/5066 358/1.13 |
| 2007/0024921 A1* | 2/2007 | Ohta | ............. | H04N 1/00249 358/448 |
| 2009/0087101 A1* | 4/2009 | Matsushita | ............. | G06K 9/00 382/190 |
| 2009/0190164 A1* | 7/2009 | Kumagai | ............. | H04N 1/32133 358/1.15 |
| 2009/0195814 A1* | 8/2009 | Tojo | ............. | H04N 1/00405 358/1.15 |
| 2015/0254503 A1* | 9/2015 | Song | ............. | G06K 9/00288 348/77 |

FOREIGN PATENT DOCUMENTS

JP    2001034128 A    2/2001
JP    2009089250 A    4/2009

* cited by examiner

*Primary Examiner* — Dung Tran

(57) ABSTRACT

An image forming apparatus has an image reading unit which reads an image, a photographing unit, a storing unit, a printing unit, a detecting unit, a notifying unit, an extracting unit, and a displaying unit. When the detecting unit detects untaken printed paper, the notifying unit notifies a user to promote reading of the image of the untaken printed paper by the image reading unit. The extracting unit extracts the data of the image of at least one part other than the face of the whole body of the user photographed by the photographing unit from the image of the printed paper read by the image reading unit. The displaying unit displays the image of at least one part other than the face of the whole body of the user extracted by the extracting unit.

8 Claims, 7 Drawing Sheets

IMAGE FORMING APPARATUS CONFIGURED FOR IDENTIFYING USER WHO LEFT PRINTED DOCUMENT IN THE OUTPUT TRAY

INCORPORATION BY REFERENCE

The disclosure of Japanese Patent Application No. 2014-155767 filed on Jul. 31, 2014 including the specification, drawings and abstract is incorporated herein by reference in its entirety.

BACKGROUND

The disclosure relates to an image forming apparatus and an image forming system.

A user performs desired printing using a copying function and a printer function in an image forming apparatus. In general, when a user performs copying, the user goes to a place where an image forming apparatus is placed, performs copying standing in front of the image forming apparatus, and then brings output printed paper.

Herein, in the image forming apparatus, a technique relating to untaken printed paper is known heretofore.

As a typical image forming apparatus, an image forming apparatus having a display means which displays a face image of a user is known. Moreover, as a typical image processing apparatus, an image forming apparatus is known which acquires an image for identifying an operator, such as a face image of an operator, in a printing operation, registers the image with index information, such as a feature amount, extracted from the printed image, reads an image from a document whose owner is to be judged, searches the owner from the index information registered in a past printing job, and then outputs an image of an operator who is the owner of the document with high probability.

SUMMARY

In one aspect of the disclosure, an image forming apparatus has an image reading unit which reads an image, a photographing unit, a storing unit, a printing unit, a detecting unit, a notifying unit, an extracting unit, and a displaying unit. The photographing unit photographs an image of at least one part other than the face of the whole body of a user who prints an image. The storing unit stores data of the image of at least one part other than the face of the whole body of the user photographed by the photographing unit. The printing unit forms an image including the data of the image of at least one part other than the face of the whole body of the user photographed by the photographing unit, and then prints the image on paper. The detecting unit detects that printed paper, which is printed by the printing unit, is untaken. When the detecting unit detects untaken printed paper, the notifying unit notifies a user to promote reading of the image of the untaken printed paper by the image reading unit. The extracting unit extracts the data of the image of at least one part other than the face of the whole body of the user photographed by the photographing unit from the image of the printed paper read by the image reading unit. The displaying unit displays the image of at least one part other than the face of the whole body of the user extracted by the extracting unit.

In another aspect of the disclosure, an image forming system has an image reading unit which reads an image, a photographing unit, a storing unit, a printing unit, a detecting unit, a notifying unit, an extracting unit, and a displaying unit. The photographing unit photographs an image of at least one part other than the face of the whole body of a user who prints an image. The storing unit stores data of the image of at least one part other than the face of the whole body of the user photographed by the photographing unit. The printing unit forms an image including the data of the image of at least one part other than the face of the whole body of the user photographed by the photographing unit, and then prints the image on paper. The detecting unit detects that printed paper, which is printed by the printing unit, is untaken. When the detecting unit detects untaken printed paper, the notifying unit notifies a user to promote reading of the image of the untaken printed paper by the image reading unit. The extracting unit extracts the data of the image of at least one part other than the face of the whole body of the user photographed by the photographing unit from the image of the printed paper read by the image reading unit. The displaying unit displays the image of at least one part other than the face of the whole body of the user extracted by the extracting unit.

DETAILED DESCRIPTION

Figure 1:
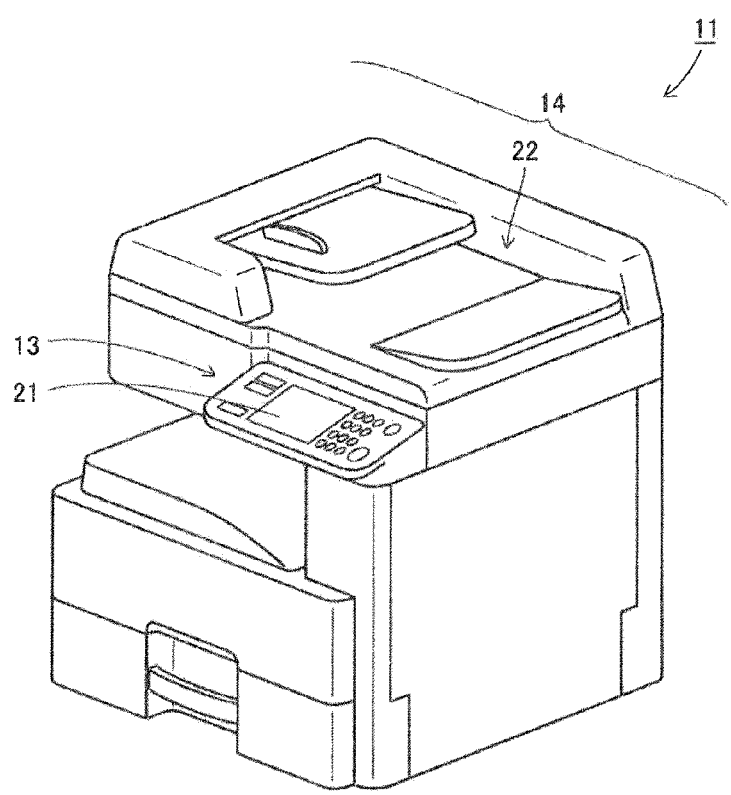
FIG. 1 is a schematic perspective diagram illustrating the appearance of a digital multifunctional peripheral when an image forming apparatus according to one embodiment of the disclosure is applied to the digital multifunctional peripheral.
Figure 2:
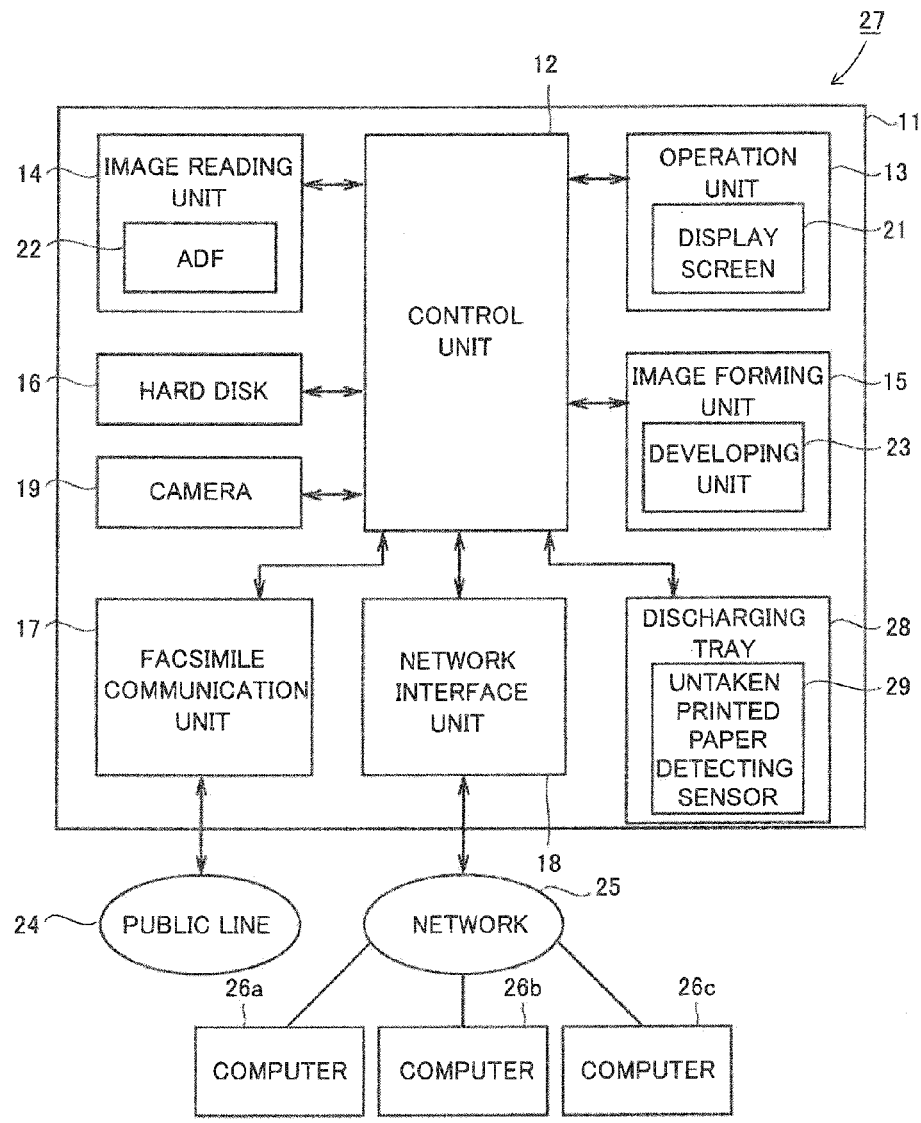
FIG. 2 is a block diagram illustrating the configuration of the digital multifunctional peripheral when the image forming apparatus according to one embodiment of the disclosure is applied to the digital multifunctional peripheral.

Hereinafter, embodiments of the disclosure are described. First, the configuration of a digital multifunctional peripheral when an image forming apparatus according to one embodiment of the disclosure is applied to the digital multifunctional peripheral is described. FIG. 1 is a schematic perspective diagram illustrating the appearance of the digital multifunctional peripheral when an image forming apparatus according to one embodiment of the disclosure is applied to the digital multifunctional peripheral. FIG. 2 is a block diagram illustrating the configuration of the digital multifunctional peripheral when the image forming apparatus according to one embodiment of the disclosure is applied to the digital multifunctional peripheral.

Referring to FIG. 1 and FIG. 2, a digital multifunctional peripheral 11 has a control unit 12, an operation unit 13, an image reading unit 14, an image forming unit 15, a discharging tray 28, a hard disk 16, a facsimile communicating unit 17, and a network interface portion 18 for connection with the network 25. The control unit 12 controls the entire digital multifunctional peripheral 11. The operation unit 13 contains a display screen 21 which displays information transmitted from the digital multifunctional peripheral 11 and input contents of a user. The operation unit 13 inputs image formation conditions, such as the number of prints and gradation and turns ON or OFF the power supply. The image reading unit 14 contains an ADF (Auto Document Feeder) 22 which automatically conveys a set document to a reading unit. The image reading unit 14 reads an image of a document and printed paper. The image forming unit 15 contains a developing unit 23 which performs development using toner. The image forming unit 15 forms an image based on a read image or image data transmitted through the network 25. The discharging tray 28 for discharging printed paper printed by the image forming unit 15 contains an untaken printed paper detecting sensor 29 which detects untaken printed paper. The hard disk 16 stores transmitted image data, input image formation conditions, and the like. The facsimile communicating unit 17 is connected to a public line 24 and performs facsimile transmission and facsimile receiving. The digital multifunctional peripheral 11 has a DRAM (Dynamic Random Access Memory) which writes or reads image data and the like but the illustration and the description thereof are omitted. The arrows in FIG. 2 indicate the flow of control signals and data relating to control and an image. The untaken printed paper detecting sensor 29 detects the presence or absence of printed paper by detecting the presence or absence of printed paper discharged to the discharging tray 28 by an actuator, an infrared sensor, and the like The digital multifunctional peripheral 11 operates as a copying machine by forming an image in the image forming unit 15 using image data of a document read by the image reading unit 14. The digital multifunctional peripheral 11 operates as a printer by forming an image in the image forming unit 15, and then prints the image on paper using image data transmitted from computers 26a, 26b, and 26c connected to the network 25 through the network interface portion 18. More specifically, the image forming unit 15 operates as a printing unit which prints a requested image. The digital multifunctional peripheral 11 operates as a facsimile machine by forming an image in the image forming unit 15 through the DRAM using image data transmitted from the public line 24 through the facsimile communicating unit 17 and transmitting image data of a document read by the image reading unit 14 to the public line 24 through the facsimile communicating unit 17. More specifically, the digital multifunctional peripheral 11 has a plurality of functions relating to image processing, such as a copying function, a printer function, and a facsimile function. Furthermore, the digital multifunctional peripheral 11 has a function capable of setting each function in detail.

An image forming system 27 containing the digital multifunctional peripheral 11 has the digital multifunctional peripheral 11 and the plurality of computers 26a, 26b, and 26c. Specifically, the image forming system 27 has the digital multifunctional peripheral 11 of the configuration described above and the plurality of computers 26a, 26b, and 26c connected to the digital multifunctional peripheral 11 through the network 25. In this embodiment, the plurality of computers 26a to 26c include three computers. Each of the computers 26a to 26c can request the digital multifunctional peripheral 11 to perform printing through the network 25. The digital multifunctional peripheral 11 and the computers 26a to 26c may be connected by wire using a LAN (Local Area Network) cable or the like or may be connected by radio. A configuration in which another digital multifunctional peripheral and a server may be connected into the network 25 may be acceptable.

The digital multifunctional peripheral 11 has a camera 19 which can photograph a user who operates the digital multifunctional peripheral 11 standing in front of the digital multifunctional peripheral 11. The camera 19 as a photographing unit is not illustrated in FIG. 1, and photographs an image of the whole body including the face of a user standing mainly in front of the operation unit 13 of the digital multifunctional peripheral 11. More specifically, the camera 19 can photograph an image of at least one part other than the face of the whole body of a user who prints an image and an image of the face. The control unit 12 stores the image of the user photographed by the camera 19 in the hard disk 16. Herein, the hard disk 16 operates as a storing unit which stores data of the image photographed by the camera 19 as a photographing unit.

Figure 3:
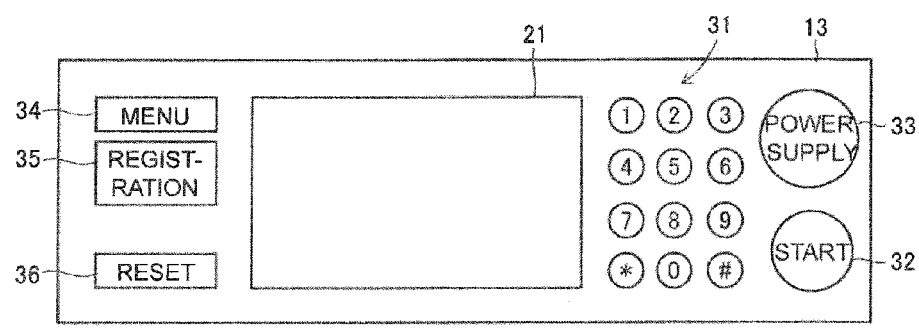
FIG. 3 is an outside view illustrating the schematic configuration of an operation unit.

Next, the configuration of the operation unit 13 described above is described in more detail. FIG. 3 is an outside view illustrating the schematic configuration of the operation unit 13. Referring to FIG. 3, the operation unit 13 includes a ten key 31 which inputs the numbers of 0 to 9 for inputting the number of prints and the like and inputs signs of "*" and "#", a start key 32 which instructs the start of printing and the start of facsimile transmission, a power supply key 33 which turns ON/OFF the power supply of the digital multifunctional peripheral 11, a menu key 34 which instructs selection of a printer function, a copying function, and the like of the digital multifunctional peripheral 11, a registration key 35 which instructs registration of various image formation conditions and a user, a reset key 36 which resets the contents of the instructions input by a user using the ten key 31 and the like, and the display screen 21 described above. The display screen 21 has a liquid crystal touch-panel function and allows input of image formation conditions and the like also from the display screen 21 and also allows selection of the functions and the like by pressing with a user's finger or the like.

Figure 4:
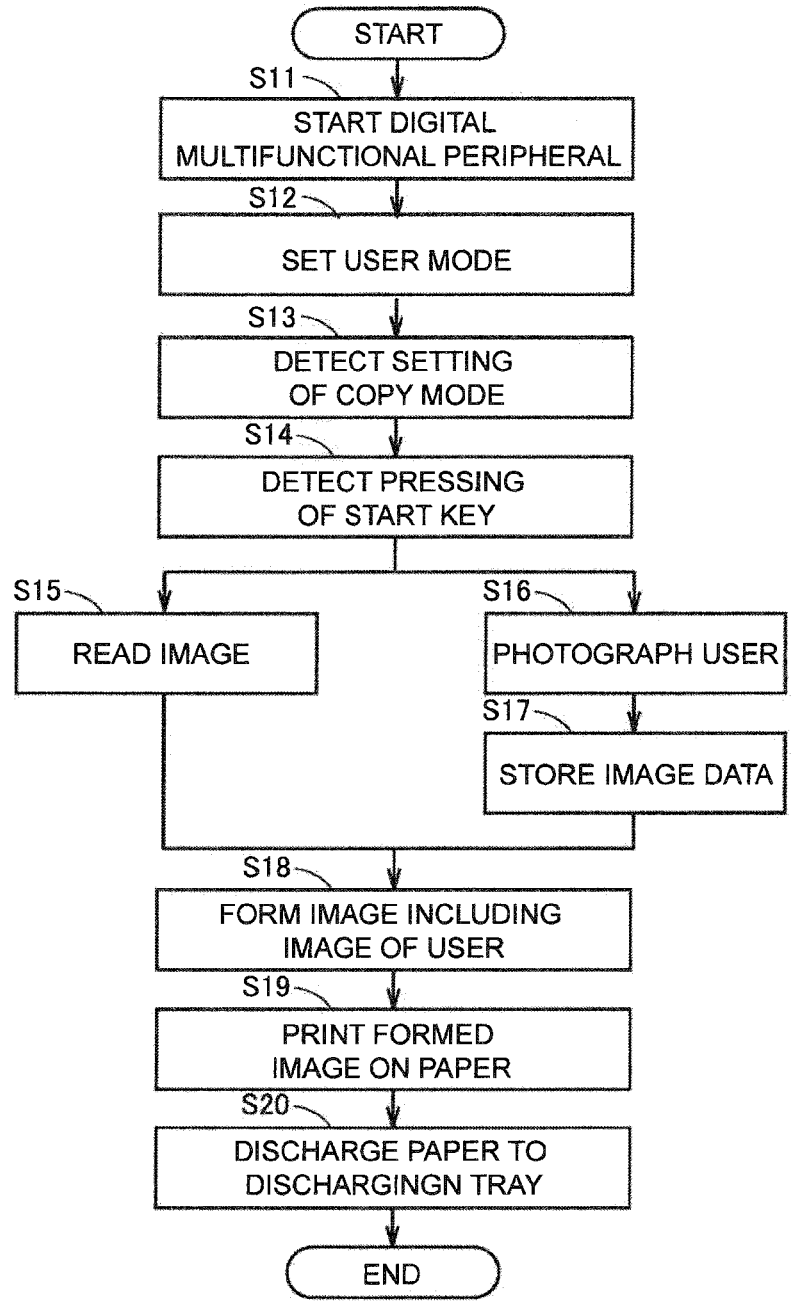
FIG. 4 is a flow chart showing the contents of processing when performing copying using the image forming apparatus according to one embodiment of the disclosure.

Next, a case where an image is formed using the digital multifunctional peripheral 11 according to one embodiment of the disclosure is first described. Herein, a case where a user who is a printing person performs copying using the digital multifunctional peripheral 11 is described. FIG. 4 is a flow chart showing the contents of processing when a user performs copying.

Referring to FIG. 4, etc., a user first starts the digital multifunctional peripheral 11 from a sleep mode which is an energy-saving mode, for example. When the starting of the digital multifunctional peripheral 11 is detected (Step S11 in FIG. 4. In the following description, "Step" is omitted.), a user who is an operator is made to set a user mode of the user (S12).

Figure 5:
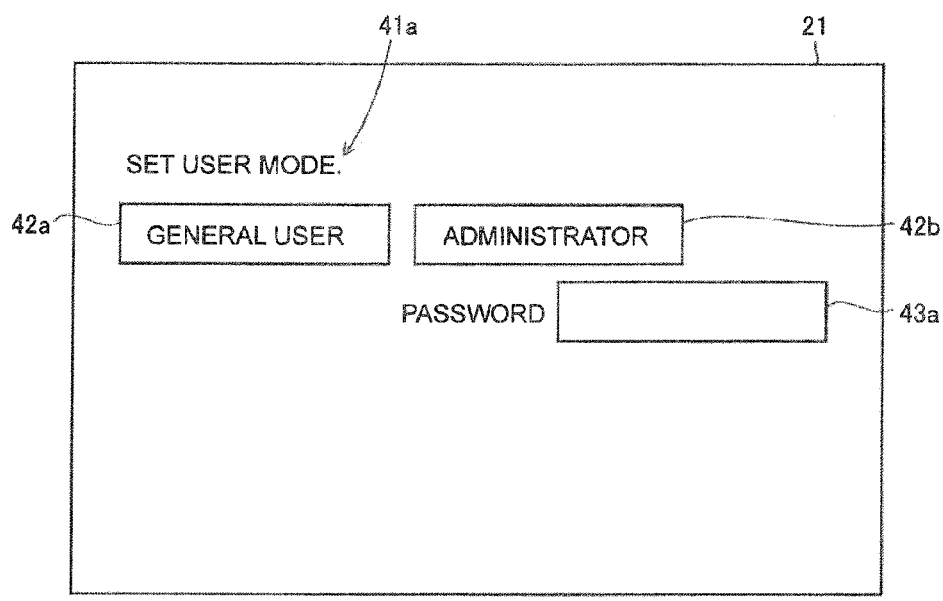
FIG. 5 is a view illustrating an example of a display screen contained in the operation unit.

FIG. 5 is a view illustrating an example of the display screen 21 of the operation unit 13 when making the user set the user mode. Referring to FIG. 5, the display screen 21 of the operation unit 13 displays a message 41a of "Set user mode", a selection key 42a indicating "General user" which allows setting of a user mode as a general user by pressing, a selection key 42b indicating "Administrator" which allows setting of a user mode as an administrator by pressing, and a password input portion 43a for inputting a password when setting the mode as an administrator. A user enters a password into the password input portion 43a using the ten key 31 and the like according to his/her authority as necessary, and presses any one of the selection keys 42a and 42b. Herein, the user mode referred to as the general user is a mode in which the user has a first authority of adjustment of image quality, setting of the number of prints, and the like when performing copying and which allows the user to perform general operations. The user mode referred to as the administrator is a mode in which a user has a second authority higher than the first authority and which allows the user to perform general operations and further to perform various settings of the digital multifunctional peripheral 11, such as setting of the access authority to the digital multifunctional peripheral 11 and the management of data stored in the hard disk 16. A person having the authority of the administrator is a person having higher awareness of security. Herein, the operation unit 13 and the like operate as a mode switching unit which switches a mode between a first mode and a second mode.

Thereafter, a setting of a copy mode set by the user is detected (S13). More specifically, the user performs various settings in copying, such as the number of copies and image quality, through the display screen 21 and the like of the operation unit 13.

After the end of the setting, the user presses the start key 32 of the operation unit 13 to start copying. Herein, when the control unit 12 detects the pressing of the start key 32 (S14), the control unit 12 starts reading of an image of paper by the image reading unit 14 (S15). In this case, paper set on the ADF 22 is successively conveyed to the reading unit, and then images are read. Moreover, the user who is a printing person is photographed by the camera 19 with the image reading (S16). In this case, the whole body including a face image of the user is photographed. Thereafter, the photographed image of the user is stored in the hard disk 16 (S17). The image of the user stored in the hard disk 16 is eliminated after a predetermined period, for example, several hours or several days, have passed.

Next, an image is formed based on the read image including the photographed image of the user (S18). In this case, an image is formed including the image of the user by so-called electronic watermarking. Thereafter, the formed image is printed on paper (S19), and then the paper is discharged to the discharging tray 28 (S20). Thus, an image is formed. A general user takes printed paper discharged to the discharging tray 28 in his/her hand, and then returns to his/her seat. In this case, the untaken printed paper detecting sensor 29 does not detect untaken printed paper. On the other hand, when the user forgets to take the printed paper discharged to the discharging tray 28, the untaken printed paper detecting sensor 29 detects that the printed paper remaining on the discharging tray 28 is untaken printed paper. Herein, the untaken printed paper detecting sensor 29 operates as a detecting unit which detects that the printed paper, which is printed by the printing unit, is untaken.

Figure 6:
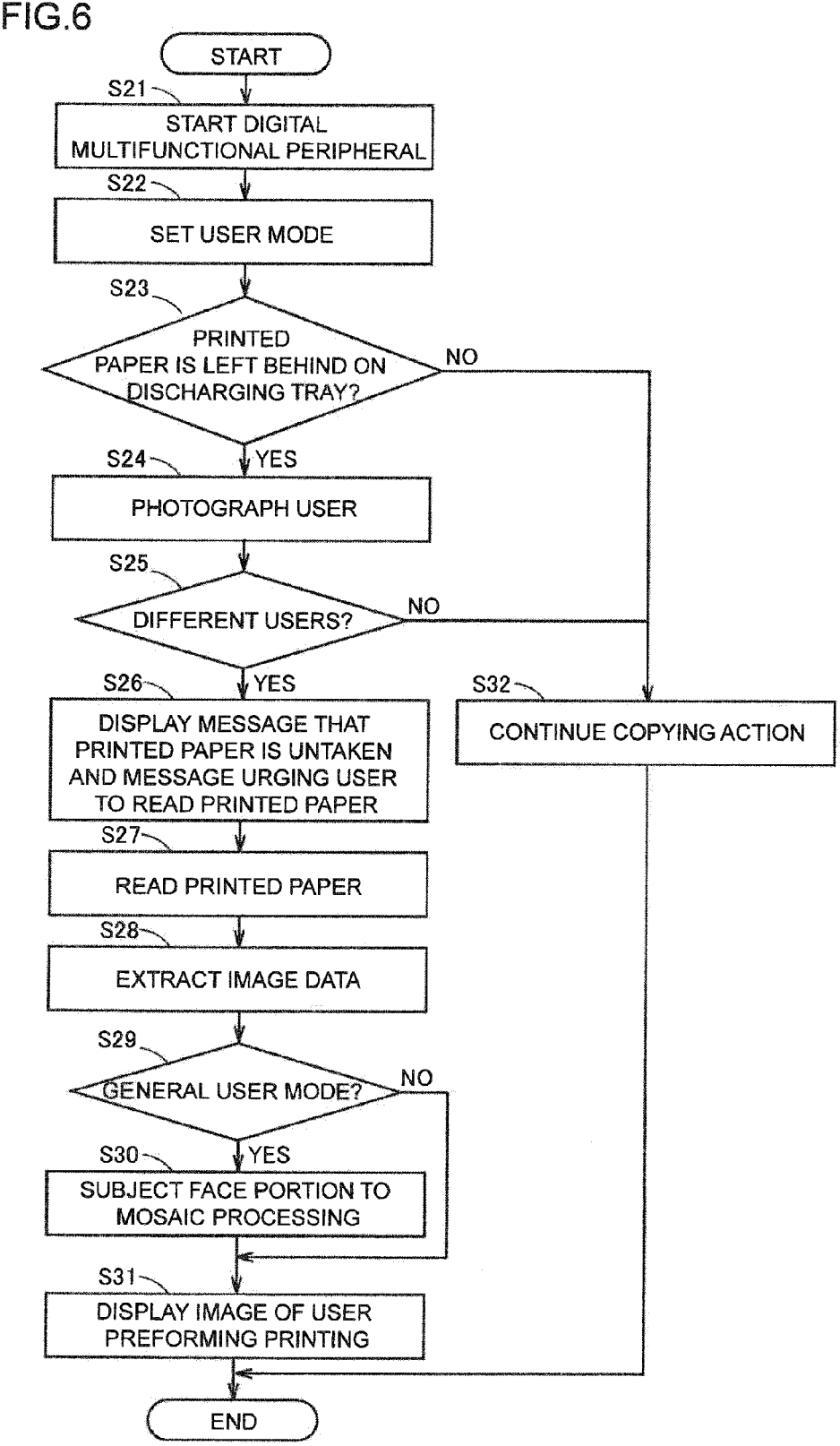
FIG. 6 is a flow chart showing the contents of processing when detecting untaken printed paper using the image forming apparatus according to one embodiment of the disclosure.

Next, a case where printed paper is untaken is described. FIG. 6 is a flow chart showing the contents of processing when printed paper is untaken. Referring to FIG. 6, the digital multifunctional peripheral 11 is started (S21), and a user mode is set (S22) in the same manner as above. Herein, the digital multifunctional peripheral 11 detects whether or not printed paper is present on the discharging tray 28 by the untaken printed paper detecting sensor 29 provided in the discharging tray 28 (S23).

When it is detected that printed paper is not present on the discharging tray 28 (NO in S23), a copying action is continued as it is along S12 to S20 shown in FIG. 4 to end the process (S32).

On the other hand, when it is detected that paper is present on the discharging tray 28 (YES in S23), a user at that time is first photographed by the camera 19 (S24). More specifically, a user currently standing in front of the digital multifunctional peripheral 11 is photographed.

Then, the image of the user already stored in the hard disk 16 is compared with the photographed image of the user, and then it is judged whether or not the images show the same user (S25). In this case, the judgment is performed by the control unit 12 provided in the digital multifunctional peripheral 11. Specifically, it is judged whether or not a dress, a hair style, the outline of the face, and the like of the photographed user are in agreement with those of the stored image of the user. Herein, the control unit 12 operates as a judging unit.

When it is judged that the images show the same user (NO in S25), i.e., when it is judged that the images are in agreement with each other, it is judged that the same user forms an image as it is or the user intends to keep the printed paper left behind on the discharging tray 28 as it is. Then, as shown in S32, the copying action is continued as it is to end the process.

On the other hand, when the images show different users, i.e., when it is judged that the images are not in agreement with each other (YES in S25), it is recognized that the user who forms an image forgot to take the printed paper on the discharging tray 28. Then, the user is promoted to read the image of the untaken printed paper. These messages are displayed on the display screen 21 of the operation unit 13 (S26). More specifically, the messages which indicate that printed paper is untaken or which notifies the user to promote reading of the image of the untaken printed paper are displayed on the display screen 21 of the operation unit 13.

Figure 7:
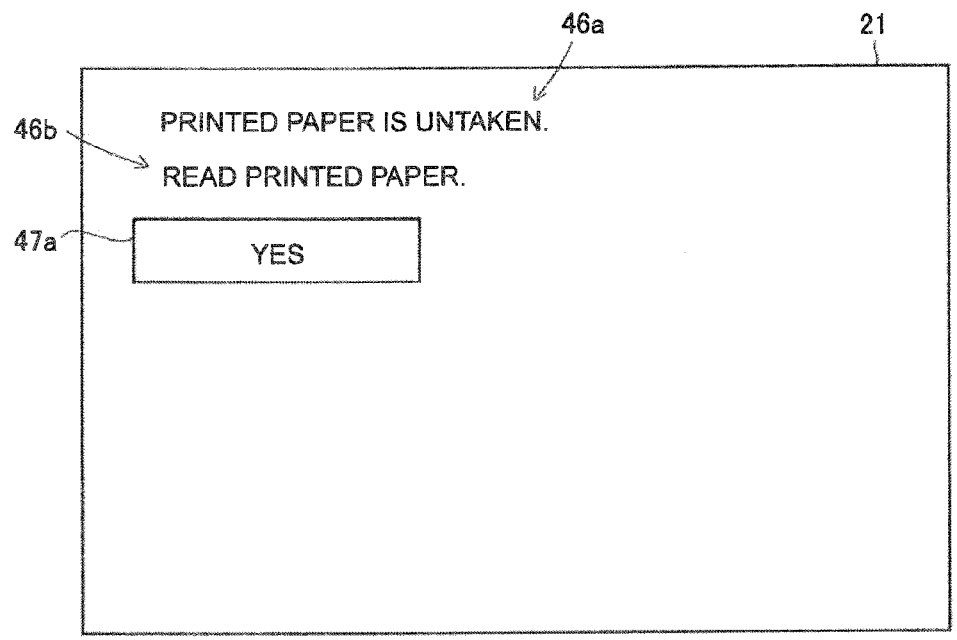
FIG. 7 is a view illustrating an example of the display screen contained in the operation unit.

FIG. 7 is a view illustrating an example of the display screen 21 of the operation unit 13 when untaken printed paper is detected. Referring to FIG. 7, the display screen 21 of the operation unit 13 displays a message 46a of "Printed paper is untaken", a message 46b of "Read untaken printed paper", and a selection key 47a indicating "Yes", which lets a user to read an image of untaken printed paper by pressing. Herein, when the operation unit 13 and the like detect untaken printed paper, the operation unit 13 and the like operate as a notifying unit which notifies a user to promote reading of the image of the untaken printed paper. A user sets the untaken printed paper on the ADF 22, and then presses the selection key 47a of "Yes" to let the image reading unit 14 read the image of the untaken printed paper read (S27). The control unit 12 and the like extract, from the image of the printed paper read by the image reading unit 14, the data of the image of the whole body of the user which is contained in the image of the printed paper by electronic watermarking in image formation and which is photographed by the camera 19 as a photographing unit (S28). Herein, the control unit 12 and the like operate as an extracting unit.

Next, the digital multifunctional peripheral 11 judges whether or not the user mode is a general user mode (S29). More specifically, the digital multifunctional peripheral 11 judges whether the user mode set in S22 is "General user" or "Administrator".

When it is judged that the user mode is a general user mode (YES in S29), the face image is subjected to mosaic processing (S30). In this case, the image of the user who is a printing person stored in the hard disk 16 is processed, so that a face portion is subjected to mosaic processing. Other parts are not subjected to mosaic processing. Then, an image of the whole body of the user including the face image subjected to mosaic processing is displayed on the display screen 21 of the operation unit 13 (S31).

On the other hand, when it is judged that the user mode is set to Administrator (NO in S29), the face portion is not subjected to mosaic processing and the image of the whole body of the user who performs printing is displayed on the display screen 21 as it is (S31). Thereafter, a user, who notices untaken printed paper by the untaken printed paper detecting sensor 29 and lets the image reading unit 14 read the untaken printed paper, specifies the user who performs printing from the image of the user displayed on the display screen 21, and then goes to a place where the printing person is present and gives the untaken printed paper to the user.

When the digital multifunctional peripheral 11 of such a configuration detects untaken printed paper by the untaken printed paper detecting sensor 29, a user is promoted to read an image of the untaken printed paper by the display screen 21 to read the image of the untaken printed paper, and then information on the image of the user contained in the image is displayed by the display screen 21. Then, the user who performs printing can be specified from the image information. Therefore, the untaken printed paper can be certainly given to the user who performs printing. Moreover, in this case, the face image is subjected to mosaic processing, and then the whole body of the user is displayed. Therefore, an improvement of security can be achieved. Therefore, such an image forming apparatus can certainly give untaken printed paper to a user who performs printing and also can improve the security.

In this case, the digital multifunctional peripheral 11 has a mode switching unit which switches a mode between a first mode as a general user who has a first authority to operate the digital multifunctional peripheral 11 and a second mode as an administrator who has a second authority higher than the first authority. The camera 19 as a photographing unit photographs a face image of a user. When the mode is switched to the first mode by the mode switching unit, the display screen 21 as a displaying unit subjects the face image of the user to mosaic processing, and then displays the processed face image of the user. Then, when the digital multifunctional peripheral 11 is operated in the first mode in which the authority is not high, a user who performs printing can be specified using the face image of the user subjected to mosaic processing. Therefore, the untaken printed paper can be certainly given to the user who performs printing and also an improvement of security can be achieved.

When the mode is switched to the second mode by the mode switching unit, the display screen 21 as a displaying unit displays the face image of the user. Then, when the digital multifunctional peripheral 11 is operated in the second mode of high authority, the user who performs printing can be specified using the face image of the user. Therefore, untaken printed paper can be more certainly given to the user who performs printing and also an improvement of security can be achieved.

In this case, a judging unit is further provided which, when the untaken printed paper detecting sensor 29 as a detecting unit detects untaken paper, lets the camera 19 as a photographing unit photograph an image of a user, and then judges whether or not the image of the user is in agreement with an image of a user stored in the hard disk 16 as a storing unit. Therefore, in a case where a user who performs printing intentionally places paper as it is, for example, it can be appropriately judged whether or not printed paper is untaken. For example, when an image is read, and then distortion in the image can be confirmed, a user performs copying again. More specifically, in the case where printed paper output by the user is left behind on the discharging tray 28 when performing a copying action again, an inquiry about untaken printed paper can be avoided.

In this case, the printing unit forms an image including data of the image, which is photographed by the camera 19 as a photographing unit, by electronic watermarking. Therefore, image formation can be more appropriately carried out.

In this case, the hard disk 16 as a storing unit eliminates the image data after a predetermined period have passed. Then, appropriate processing considering the capacity of the hard disk 16 can be performed. Therefore, more efficient processing can be performed.

In this case, the camera 19 as a photographing unit includes a camera which photographs the front side of the image forming apparatus. Therefore, an image of a user can be more appropriately photographed using the camera.

In the embodiments described above, an image of the whole body of a user, who prints an image, is photographed by the photographing unit. However, the configuration is not limited thereto and a configuration may be acceptable in which an image of at least one part other than the face of the whole body of the user who prints an image is photographed. Thus, an improvement of security can be more certainly achieved. A face image is subjected to mosaic processing, and then the whole body of the user is displayed. However, the configuration is not limited thereto and a configuration may be acceptable in which at least one part other than the face of the whole body of the user may be displayed. Also in this configuration, the user who performs printing can be specified from image information, untaken printed paper can be certainly given to the user who performs printing, and also an improvement of security can be achieved. In particular, when the digital multifunctional peripheral is placed in a company and a portion of a nameplate attached to the uniform is displayed as the image information, for example, even in the case where a user who notices untaken printed paper does not know the face of the owner of the printed paper, the user who notices the untaken printed paper can certainly give the untaken printed paper to the user who performs printing and also an improvement of security can be achieved.

In the embodiments described above, an image is formed including image data by electronic watermarking. However, the configuration is not limited thereto and the image data may be included by other methods, e.g., a bar code and the like.

In the embodiments described above, a face image is subjected to mosaic processing. However, the configuration is not limited thereto and a configuration may be acceptable in which a face image is subjected to blurring processing, reversal processing, and the like.

In the embodiments described above, a configuration may be acceptable in which the judging unit is not provided and an inquiry about whether or not printed paper is untaken is performed every time after a user is photographed. Furthermore, a configuration may be acceptable in which, after the inquiry is issued, the next processing can be skipped and the process can proceed to a subsequent step.

In the embodiments described above, it is notified that printed paper is untaken and the like by indicating the fact on the display screen of the operation unit. However, the configuration is not limited thereto and the notification may be performed by voice. It is a matter of course that the notification by voice may be performed with the display on the display screen.

In the embodiments described above, the case where a user performs copying is described. However, the embodiment is applied also to a case where printing is performed from a computer connected to the network for example, i.e., a case where a user uses the digital multifunctional peripheral as a printer. In this case, after a print instruction is issued by a computer, an image of a user who comes to take printed paper to the digital multifunctional peripheral is photographed. The subsequent processing is the same as that in the case of performing copying.

The image forming system according to this disclosure may be configured as follows. More specifically, the image forming system has an image reading unit which reads an image. The image forming system has a photographing unit which photographs an image of at least one part other than the face of the whole body of a user who prints an image. The image forming system has a storing unit which stores data of the image of at least one part other than the face of the whole body of the user photographed by the photographing unit. The image forming system has a printing unit which forms an image including the data of the image of at least one part other than the face of the whole body of the user photographed by the photographing unit, and then prints the image on paper. The image forming system has a detecting unit which detects that printed paper, which is printed by the printing unit, is untaken. The image forming system has a notifying unit which, when the detecting unit detects untaken printed paper, notifies a user to promote reading of the image of the untaken printed paper by the image reading unit. The image forming system has an extracting unit which extracts the data of the image of at least one part other than the face of the whole body of the user photographed by the photographing unit from the image of the printed paper read by the image reading unit. The image forming system has a displaying unit which displays the image of at least one part other than the face of the whole body of the user extracted by the extracting unit. Such a configuration may also be acceptable. More specifically, a configuration may be acceptable in which a camera as the photographing unit and a hard disk as the storing unit which stores data of an image of at least one part other than the face of the whole body of a user photographed by the photographing unit may be provided outside the digital multifunctional peripheral 11.

The embodiments and Examples disclosed in this specification are examples in all the respects and are not limited in any aspect. The scope of the disclosure is defined by not the description above but the claims and any alternation which comes within the meaning of the scope of the claims is to be embraced within the scope of the claims.

According to the image forming apparatus and the image forming system according to the disclosure, untaken printed paper can be certainly given to a user who performs printing and also the image forming apparatus and the image forming system according to the disclosure are particularly effectively utilized when an improvement of security is required.

What is claimed is:

1. An image forming apparatus comprising:
an image reading unit which reads an image;
a photographing unit which photographs an image of at least one part other than a face of a whole body of a user who prints an image;
a storing unit which stores data of the image of at least one part other than the face of the whole body of the user photographed by the photographing unit;
a printing unit which forms an image including the data of the image of at least one part other than the face of the whole body of the user photographed by the photographing unit, and then prints the image on paper;
a detecting unit which detects that printed paper, which is printed by the printing unit, is untaken;
a notifying unit which, when the detecting unit detects untaken printed paper, notifies a user to promote reading of the image of the untaken printed paper by the image reading unit;
an extracting unit which extracts the data of the image of at least one part other than the face of the whole body of the user photographed by the photographing unit from the image of the printed read by the image reading unit; and
a displaying unit which displays the image of at least one part other than the face of the whole body of the user extracted by the extracting unit.

2. The image forming apparatus according to claim 1 further comprising:
a mode switching unit which switches a mode between a first mode having a first authority of operating the image forming apparatus and a second mode having a second authority higher than the first authority, wherein
the photographing unit photographs a face image of the user, and
the displaying unit which, when the mode is switched to the first mode by the mode switching unit, subjects the face image of the user to mosaic processing, and displays the mosaic-processed face image.

3. The image forming apparatus according to claim 2, wherein the displaying unit which, when the mode is switched to the second mode by the mode switching unit, displays the face image of the user.

4. The image forming apparatus according to claim 1 further comprising:
a judging unit which, when the detecting unit detects untaken printed paper, lets the photographing unit photograph an image of the user, and then judges whether or not the photographed image is in agreement with the image of the user stored in the storing unit.

5. The image forming apparatus according to claim 1, wherein the printing unit forms an image including the data of the image of at least one part other than the face of the whole body of the user photographed by the photographing unit by electronic watermarking.

6. The image forming apparatus according to claim 1, wherein the storing unit eliminates the image data after a predetermined period passes.

7. The image forming apparatus according to claim 1, wherein the photographing unit contains a camera which photographs a front side of the image forming apparatus.

8. An image forming system comprising:
an image reading unit which reads an image;
a photographing unit which photographs an image of at least one part other than a face of a whole body of a user who prints an image;
a storing unit which stores data of the image of at least one part other than the face of the whole body of the user photographed by the photographing unit;
a printing unit which forms an image including the data of the image of at least one part other than the face of the whole body of the user photographed by the photographing unit, and then prints the image on paper;
a detecting unit which detects that printed paper, which is printed by the printing unit, is untaken;
a notifying unit which, when the detecting unit detects untaken printed paper, notifies a user to promote reading of the image of the untaken printed paper by the image reading unit;
an extracting unit which extracts the data of the image of at least one part other than the face of the whole body of the user photographed by the photographing unit from the image of the printed paper read by the image reading unit; and a displaying unit which displays the image of at least one part other than the face of the whole body of the user extracted by the extracting unit.

\* \* \* \* \*